US005386891A

United States Patent [19]

Shea

[11] Patent Number: 5,386,891

[45] Date of Patent: Feb. 7, 1995

[54] MECHANISM FOR CONTROLLING THE RAISING AND LOWERING OF A DOOR

[75] Inventor: Tsung-Wen Shea, Taipei, Taiwan, Prov. of China

[73] Assignee: Anchuan Corporation, Taipei, Taiwan, Prov. of China

[21] Appl. No.: 253,615

[22] Filed: Jun. 3, 1994

Related U.S. Application Data

[60] Continuation of Ser. No. 979,797, Nov. 19, 1992, abandoned, which is a division of Ser. No. 859,833, Mar. 30, 1992, Pat. No. 5,203,392.

[51] Int. Cl.[6] .............. B60T 13/04

[52] U.S. Cl. .............. 188/171; 188/330; 160/7

[58] Field of Search .............. 188/216, 171, 166, 167, 188/329, 330, 332, 338, 339, 79.52; 160/1, 7, 9, 88

[56] References Cited

U.S. PATENT DOCUMENTS

| | | | |
|---|---|---|---|
| 774,855 | 11/1904 | Smith . | |
| 803,618 | 11/1905 | Mumford | 160/1 |
| 842,968 | 2/1907 | McCloud | 160/1 |
| 1,096,446 | 5/1914 | Mesker et al. | 160/1 |
| 1,231,590 | 7/1917 | Friedlaender | 188/171 |
| 1,594,721 | 8/1926 | Gilmore . | |
| 1,649,797 | 11/1927 | Winn, Jr. | 160/310 X |
| 1,658,513 | 2/1928 | Bumbarger | 160/133 |
| 1,955,826 | 4/1934 | Paul | 160/7 |
| 2,019,084 | 10/1935 | Miller | 160/7 |
| 2,019,085 | 10/1935 | Miller | 160/8 |
| 2,110,231 | 3/1938 | McCloud | 160/310 X |
| 2,390,117 | 12/1945 | Michelman | 160/310 X |
| 2,564,208 | 8/1951 | Michelman | 160/7 X |
| 2,670,065 | 2/1954 | Stevens, Jr. | 160/133 X |
| 2,939,551 | 6/1960 | Hansen | 188/171 |
| 2,946,377 | 7/1960 | Zoll et al. | 160/8 |
| 2,957,521 | 10/1960 | Greegor | 160/133 |
| 3,102,580 | 9/1963 | Greegor | 160/133 |
| 3,207,273 | 9/1965 | Jurin | 189/49 |
| 3,512,302 | 5/1970 | Sivin et al. | 160/188 X |
| 3,613,765 | 10/1971 | Sivin | 160/7 X |
| 3,955,840 | 5/1976 | Rawls et al. | 292/229 |
| 4,112,996 | 9/1978 | Föhl | 160/296 |
| 4,130,156 | 12/1978 | Wardlaw | 160/9 |
| 4,147,197 | 4/1979 | Bailey et al. | 160/7 |
| 4,219,107 | 8/1980 | Ford | 188/134 |
| 4,848,522 | 7/1989 | Wolf | 177/71.2 |
| 4,875,558 | 10/1989 | Berkhan et al. | 188/171 |
| 5,022,452 | 6/1991 | Burrell | 160/7 |

FOREIGN PATENT DOCUMENTS

| | | | |
|---|---|---|---|
| 2441396 | 7/1980 | France | 160/1 |
| 2921064 | 11/1979 | Germany | 188/171 |
| 0104458 | 6/1982 | Japan | 188/171 |
| 576202 | 3/1946 | United Kingdom . | |

*Primary Examiner*—Robert J. Oberleitner
*Assistant Examiner*—Peter M. Poon
*Attorney, Agent, or Firm*—Cohen, Pontani, Lieberman, Pavane

[57] ABSTRACT

A mechanism for controlling the raising and lowering of a door comprising a speed reduction gearing, a high speed input shaft and a low speed output shaft connected to the gearing, and a governor mounted on the input shaft for regulating the input shaft's rotational speed. More particularly, the mechanism is provided with a brake having a movable brake shoe, a temperature sensitive link and an elongate member having a central portion coupled to the brake shoe. As well, the first portion of the elongate member is engageable with the temperature sensitive element and a second portion of the elongate member is engageable with the actuator. In this way, the elongate member is provided for moving the brake shoe to the release position in response to one of (1) the temperature sensitive link upon the temperature reaching a predetermined temperature and (2) the actuator.

7 Claims, 6 Drawing Sheets

MECHANISM FOR CONTROLLING THE RAISING AND LOWERING OF A DOOR

This is a continuation of U.S. application Ser. No. 07/979,797, filed Nov. 19, 1992 now abandoned which, in turn, is a division of application Ser. No. 07/859,833, filed Mar. 30, 1992 (which issued on Apr. 20, 1993 bearing U.S. Pat. No. 5,203,392.

FIELD OF THE INVENTION

The present invention relates to a rolling door combined with a mechanism which controls the raising and lowering of the door. The so-called "rolling door" comprises a curtain including a plurality of interconnected relatively pivotal horizontal slats and a pair of vertical guides positioned on both sides of the curtain for guiding the curtain for vertical movement between a first or raised position and a second or lowered position. More particularly, the mechanism is used to regulate the raising and lowering of a rolling fire door. During normal ambient conditions, the mechanism holds the door open; however, if a fire occurs, the mechanism releases the fire door permitting a regulated closing of the door to secure the opening and to prevent the fire from spreading from one location to another.

SUMMARY OF THE INVENTION

This invention addresses the need for a mechanism which can control the opening and closing of a door, particularly a fire door. The present invention is such a mechanism comprising a speed reduction gearing, a governor, and a brake combined with a rolling fire door. The mechanism, by itself, controls the speed of the door when it is closing under the gravitational pull on the door. Additionally, a motor or a hand chain assembly which is manually operated, may be attached to the input shaft of the mechanism to further control the opening and closing of the door.

BACKGROUND OF THE INVENTION

Operating mechanisms to control the raising and lowering of doors have been used for many years. Among the doors so controlled are fire doors including fire doors of the type comprising a plurality of horizontal slats pivotally connected to one another to enable the fire door to be reeled in when raised and unreeled when lowered. There are numerous prior art mechanisms known and used for raising and lowering such fire doors both in normal or non-emergency conditions and during a Fire. In such operating mechanisms, electric motors are commonly included to raise the door. However when a fife occurs, these operating mechanisms disengage the motor from the fire door and allow the door to close either under the urging of an auxiliary spring activated by mechanical means or by the gravitational pull on the door resulting from the release of tension from a torsion spring counterbalancing mechanism. Previously known fire doors primarily rely on mechanical means such as pendulum or oscillating governors, friction discs operating in viscous fluid baths, mechanical ratchets, cams or arms to release the fire door and govern its descent to secure the opening. However, these devices are unreliable because they often jam or cease functioning while the door is descending. The torsion spring counterbalancing mechanisms are also unreliable, expensive and difficult to adjust to assure that the door will move downwardly at a safe rate to a secure closed position. Centrifugally operative break type governors have also been employed to control the downward velocity of a fire door. However, such governors have always acted in conjunction with a low speed shaft connected to the door, which low speed shaft is difficult to control by devices responsive to centrifugal force. These problems are compounded by the fact that repeated use of the auxiliary springs and the springs in the counterbalancing mechanism often result in deformation due to excessive heating, as during a fire, and to general mechanical fatigue. Therefore, the need exists for an improved fire door operating mechanism for regulating the raising and lowering of the door which effectively controls the fire door's movement without the need of springs or unreliable mechanical means.

BRIEF DESCRIPTION OF THE DRAWINGS

The preferred embodiment of the invention will be explained in further detail and in reference to the drawings, in which.

DETAILED DESCRIPTION OF THE PREFERRED EMBODIMENT

Figure 1:
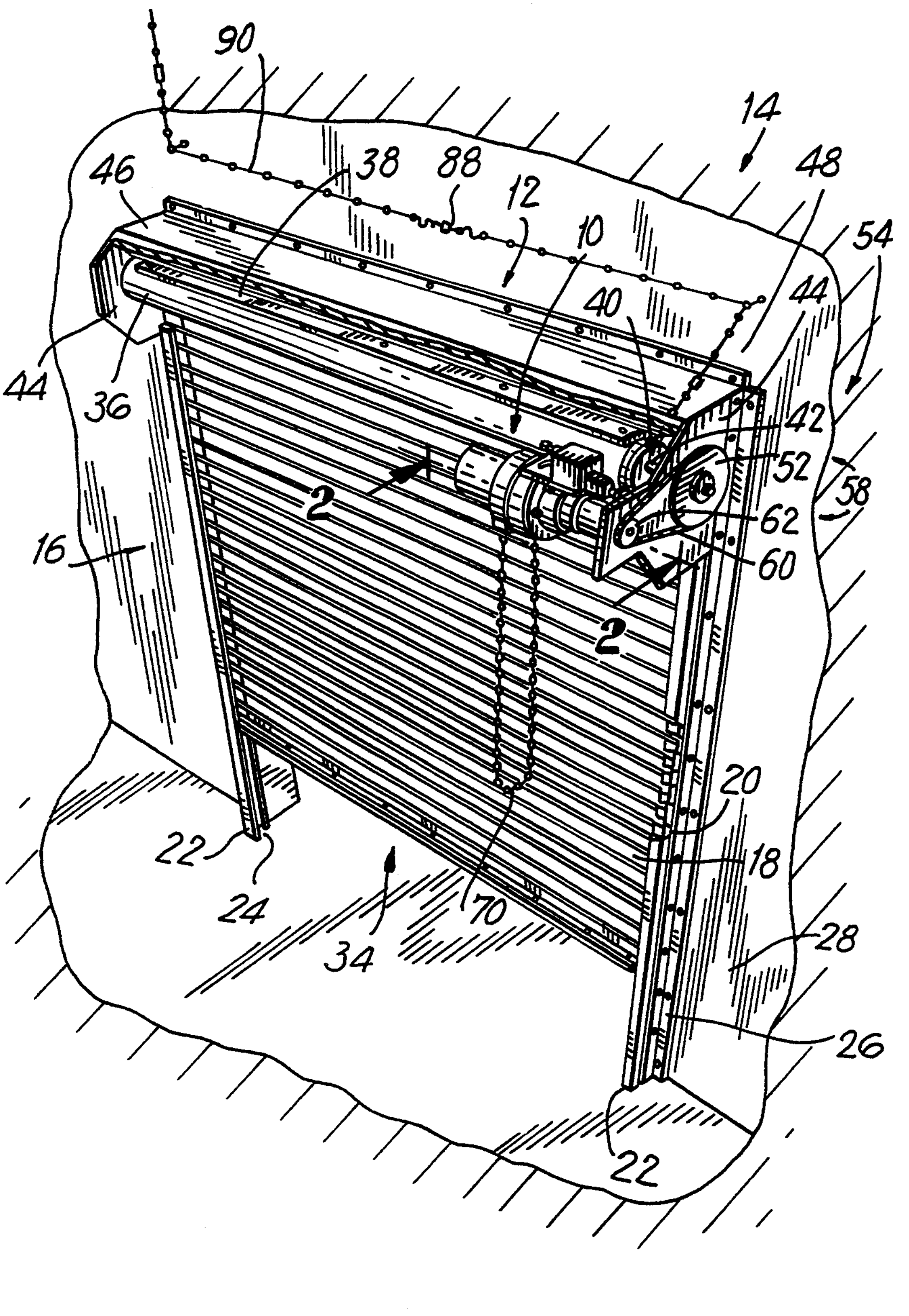
FIG. 1 is a perspective view of a rolling fire door and a regulating mechanism embodying the present invention with some pans broken away in order to reveal other parts.

The present invention relates to a rolling door combined with a mechanism which controls the raising and lowering of the door. More particularly, the mechanism is used to regulate the raising and lowering of a fire door and is shown in FIGS. 1 to 5 and is generally designated by the reference numeral 10. The regulating mechanism 10 combined with a fire door 12 comprises a fire door assembly 14.

Figure 6:
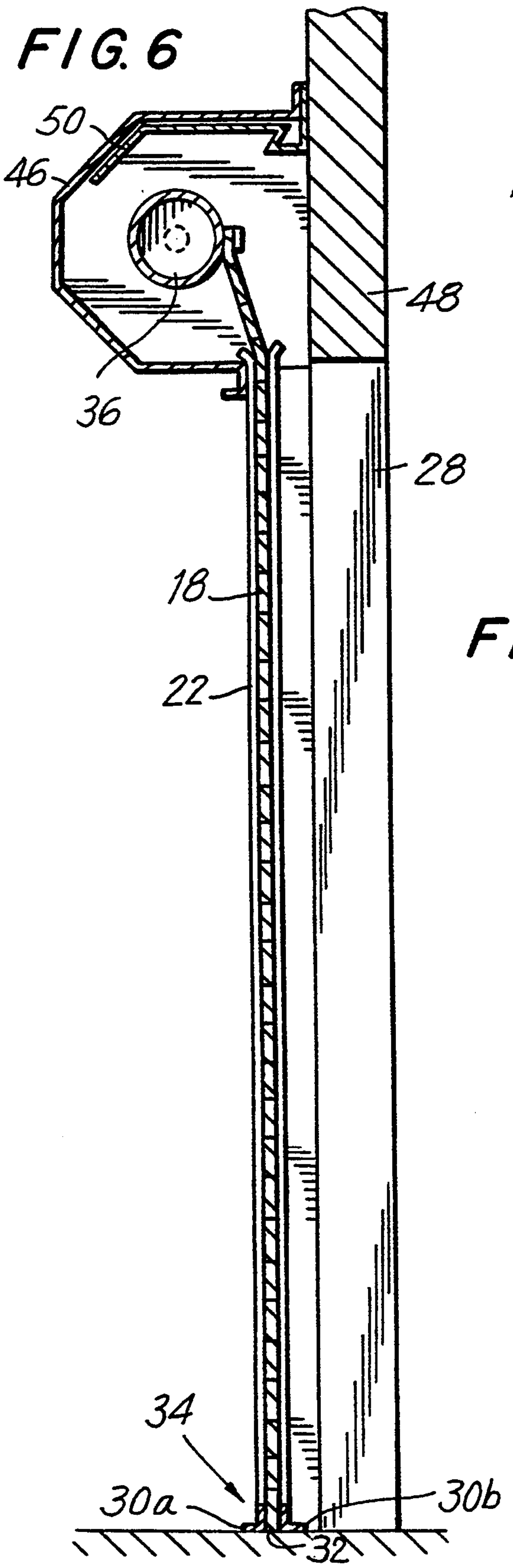
FIG. 6 is a schematic cross-sectional view of the door in a closed position.
Figure 7:
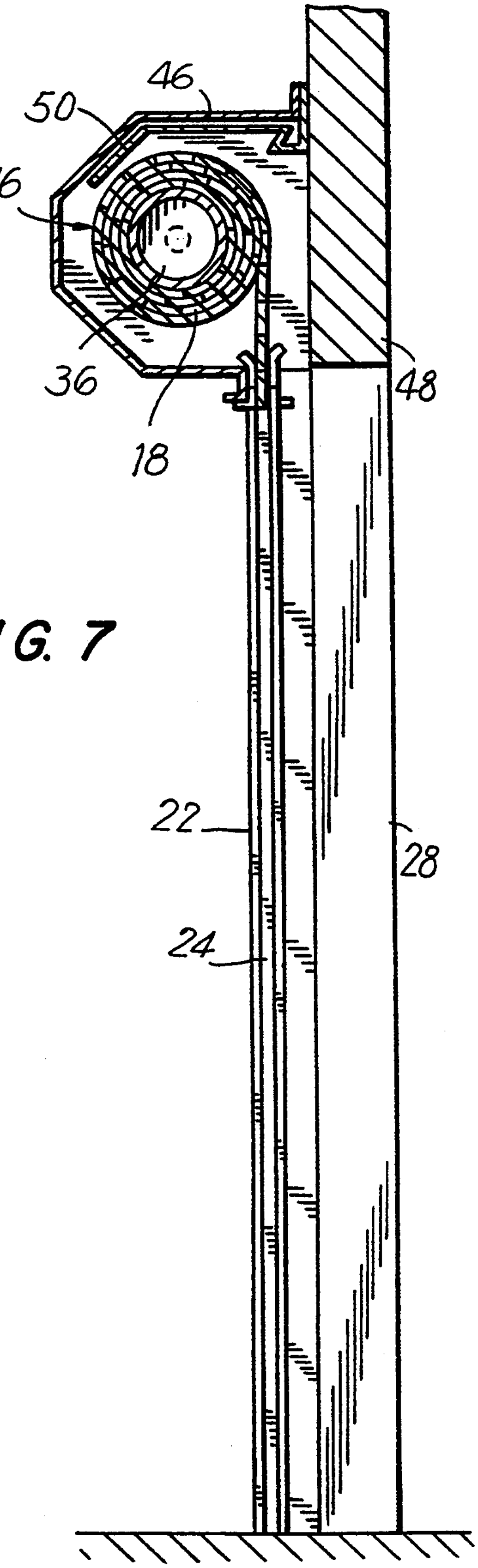
FIG. 7 is a schematic cross-sectional view of the door in an open position.

FIG. 1 shows a fire door 12 which comprises a curtain 16 including a plurality of interconnected relatively pivotal horizontal slats 18, which are kept in alignment by endlocks 20. As shown and presently preferred, endlocks 20 lock each end of alternate slats to act as a wearing surface, to maintain slat alignment and to retain the curtain 16 when there are wind pressures in a pair of vertical guides 22, here shown as channels, positioned on either side of the curtain 16. Other forms of endlocks may be employed. The pair of vertical guides 22 are for vertically guiding the movement of the slats 18 inside the guides 22 to a first or raised position (FIG. 7) and to a second or lowered position (FIG. 6). While the preferred embodiment for the fabrication of the slats 18 of the curtain 16 is either galvanized or stainless steel, other fireproof or fire retardant materials may be used without departing from this invention, such as, for example, materials according to Underwriters Laboratories (UL) and/or National Fire Protection Association (NFPA) requirements. The guide 22 is secured to a wall or door frame or other structure 28 by a mounting angle 26. Since the guides 22 are preferably made of metal or the like, they are slotted to allow for heat expansion of the metal when a fire occurs to prevent the guides 22 from deforming and making the fire door nonfunctional. As shown and presently preferred, at the bottom of the curtain 16, two angles 30*a* and 30*b* are attached to the bottom slat 32 to form a bottom bar 34 to reinforce the bottom of the curtain 16 (FIG. 6). Like the guides, be bottom bar 34 is slotted to provide for the heat expansion of the metal.

The top of the curtain 16 is fixed to a horizontally elongated rotatable member 36 for winding and unwinding the curtain 16 around the member 36 to respectively raise and lower the curtain 16. (See FIGS. 6 and 7) In its preferred embodiment, the elongated rotatable member 36 is a hollow barrel, tube or shaft. The member 36 may also be a solid or partially solid member, tube, shaft, barrel or the like. The curtain 16 is shown as connected to the rotatable member or barrel 36 by a starter slat 38. In its preferred embodiment, the barrel 36 is supported by at least two plugs 40 with one being inserted at each end of the barrel 36. The barrel 36 could also have a shaft or tube extending the entire length of the barrel. Although the present invention does not require any type of spring such as a torsion spring counterbalancing mechanism to assist the closing of the door 12 under gravitational pull, a torsion spring my be incorporated within the barrel 36 to act if necessary as an additional closing means. The shafts 42 of the plugs are then attached to endplates 44 to provide support for the barrel 36. Ball bearings (not shown) positioned in the endplates 44 enable the shafts 42 of the plugs 40 to rotate. The endplates 44 are mounted to the mounting angle 26 which is secured to the wall 28. A hood 46 which is typically a sheet metal housing, is mounted horizontally between the endplates 44 and secured to a lintel 48 which is a horizontal member spanning and carrying the load above an opening for a fife door and usually constitutes a pan of a wall, beam or the like directly above the door opening. The hood 46 encloses the coiled curtain 16 to act as a fire stop by closing off the space between the coiled curtain and the lintel. A hood or fire baffle 50 (FIGS. 6 and 7) which is a hinged sheet metal piece within the hood 46 acts as an additional fire stop. A temperature sensitive actuator 88, such as a fusible link, releasably holds the baffle 50 in a raised position. However, during a fire, the fusible link will melt and release the baffle 50 which then drops down to close the space between the top of the curtain 16 and the hood 46 to prevent smoke and fire from passing under the lintel 48 and over the barrel 36.

Figure 2:
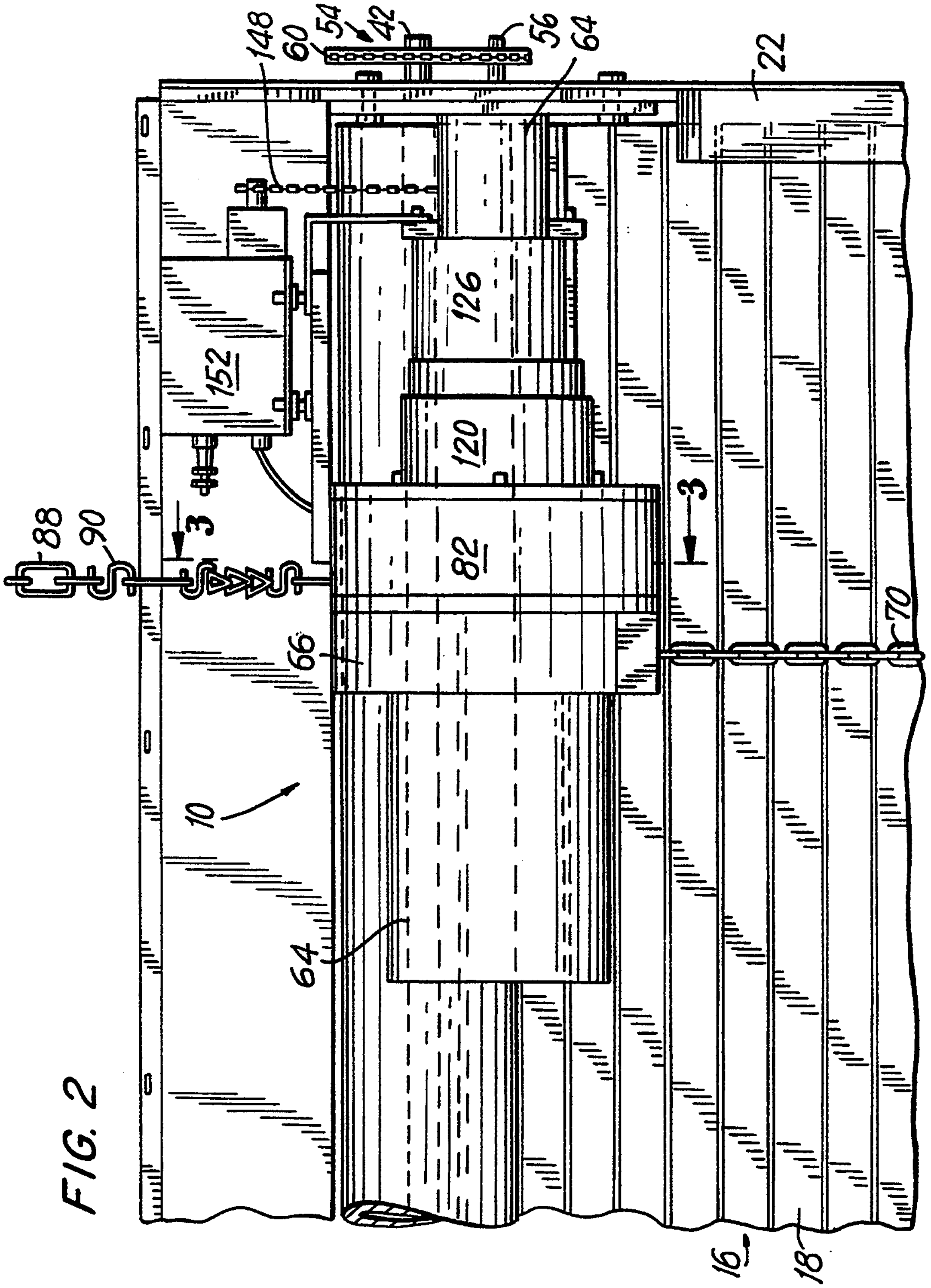
FIG. 2 is a sectional view in enlarged scale of the mechanism shown in FIG. 1 taken along line 2—2 in FIG. 1.

The preferred embodiment of the present invention includes the regulating mechanism 10 mounted or attached to the right endplate 44 directly in front of the barrel 36 outside of the hood 46 (FIG. 1 ). Alternatively, the regulating mechanism 10 may be attached to either endplate and may be placed directly in front of the barrel 36, either under or outside of the hood or in axial alignment with the rotatable member 36. For reasons that will become apparent hereinafter, additional speed reduction gearing would be preferably included if the regulating mechanism 10 was axially aligned with the rotatable member 36. The preferred embodiment for the means for operatively connecting the rotatable member 36 to the output shaft 56 of the regulating mechanism 10 comprises a chain drive (FIG. 2). The chain drive 54 includes one or more drive sprockets 58 used in connection with a like number of roller chains 60 and may have a variety of configurations. In the present embodiment, a large drive sprocket 52, is attached to the plug shaft 42 and a small drive sprocket 62 is attached to the output shaft 56 of the regulating mechanism 10 with the sprockets 62, 52 being in driving relation by a roller chain 60. In the present embodiment, the chain drive 54 creates a 5 to 1 ratio between the output shaft 56 of the regulating mechanism 10 and the shaft 42 of the plug 40 thereby decreasing the speed of the rotatable member 36 in order to control the winding and unwinding of the curtain 16. It is to make up for the omission of this 5:1 ratio that additional reduction gearing is preferred when the mechanism 10 is aligned with the rotatable member 36.

The preferred embodiment of the regulating mechanism 10 is shown in FIGS. 2 to 5. The preferred embodiment of the present invention has means for rotating the input shaft of the regulating mechanism. This rotating means may comprise a motor 64 having a high-starting torque, a conventional hand chain assembly 66, hand crank (not shown) or the like. The motor 64 may be a constant-speed, multi-speed, adjustable-speed or varying-speed motor or the like. Additionally; the motor 64 may be driven pneumatically, electrically or hydraulically. Under normal operation, power is fed to the motor 64 via a control box (not shown). Also an additional electrical power source for the motor 64, such as a generator, battery or the like (not shown), may be connected to the motor to provide auxiliary power in case of a power failure. As shown and preferred, the drive shaft of the motor 64 (not shown) passes through the hand chain assembly 66 to drive a shaft 68 engaging a coupling 76. The shaft 68 drives the coupling 76 to in turn drive an input shaft 78 which passes through a cylindrical hole 80 of the means for releasing a brake 82 and in a support plate 85 for the releasing mechanism 82. The input shaft 78 drives an output shaft 56 of the regulating mechanism 10 in order to raise or lower the fire door 12.

Figure 3:
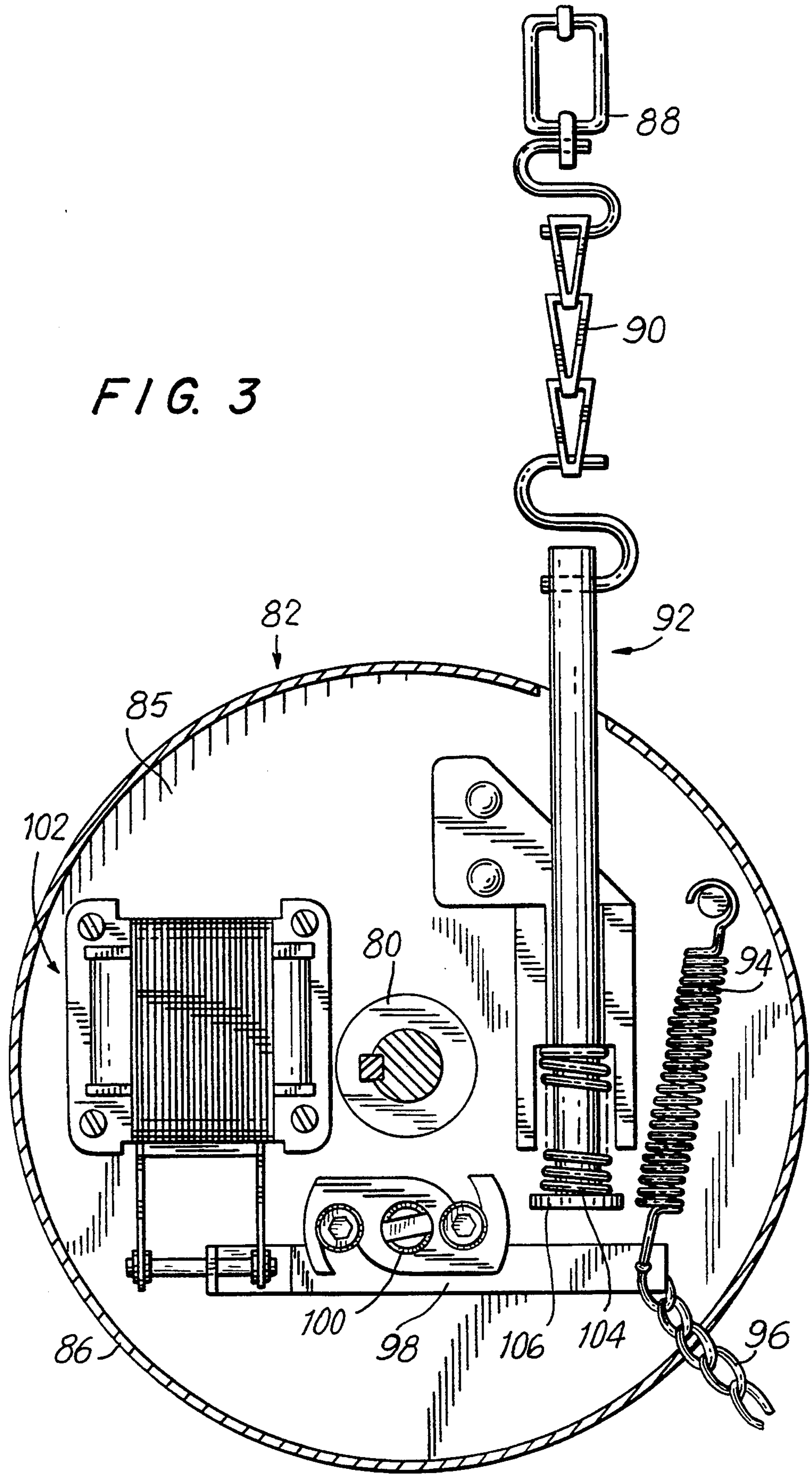
FIG. 3 is a cross-sectional view of a releasing mechanism taken along line 3—3 in FIG. 2.
Figure 4:
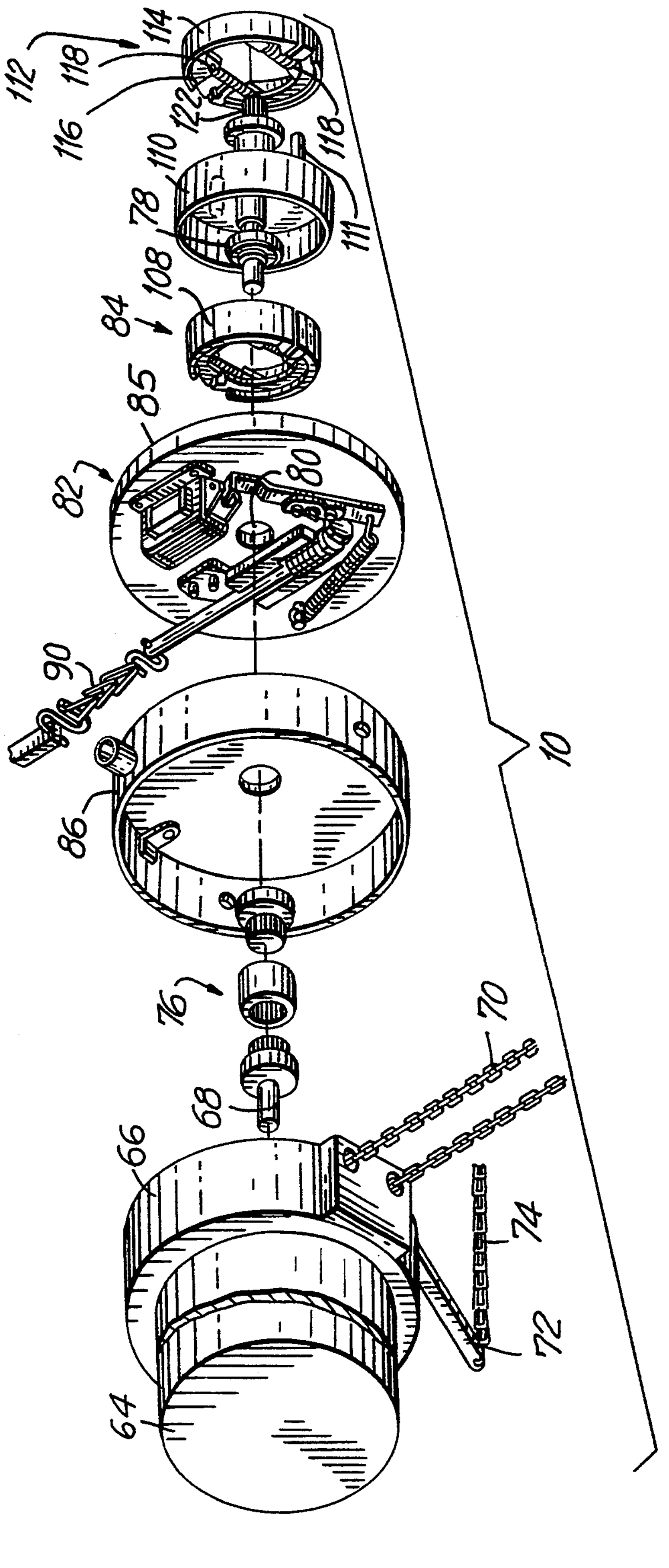
FIGS. 4 and 5, when taken together with FIG. 4 on the left make up an exploded perspective view of the interior of the regulating mechanism.
Figure 5:
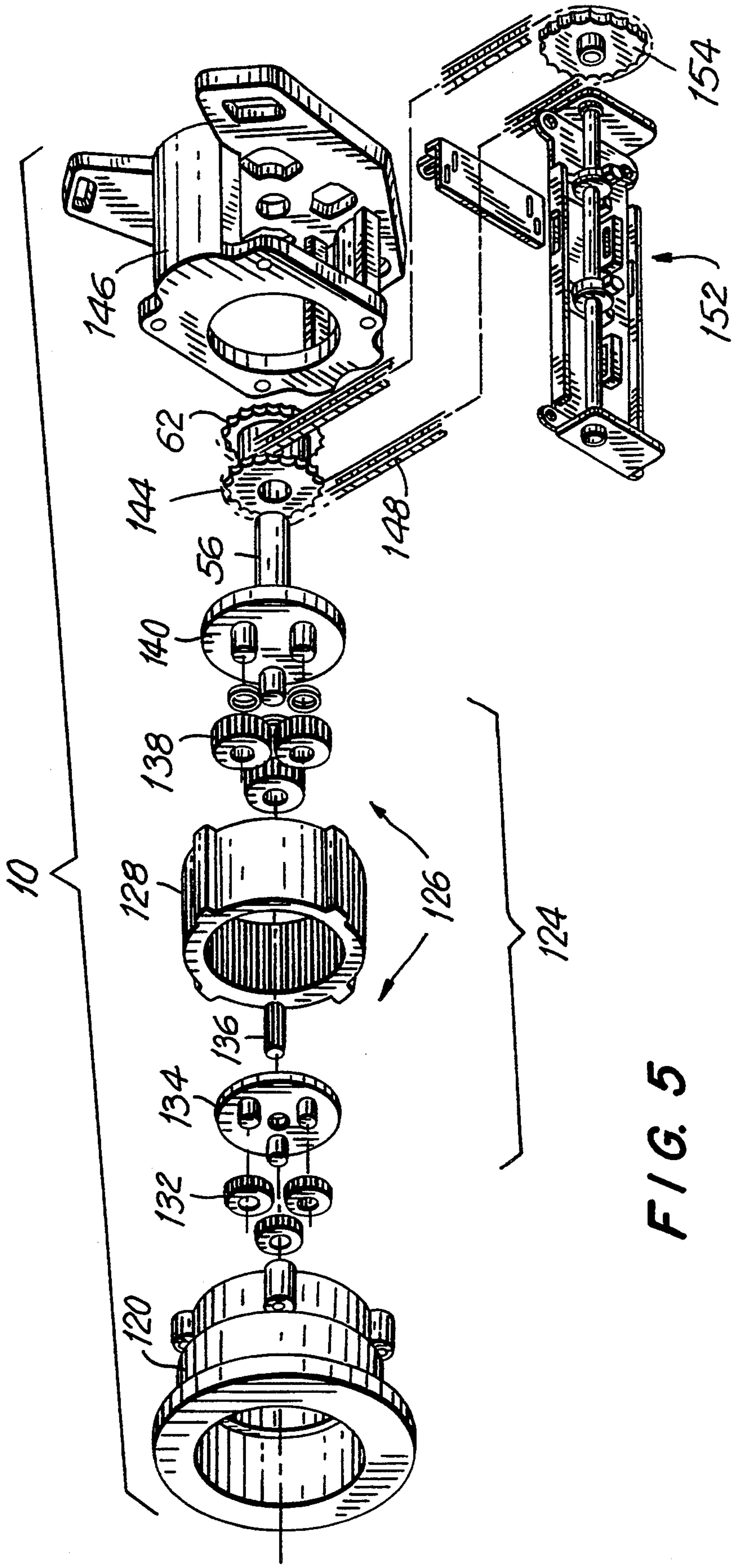

The releasing mechanism 82 is housed in the sheet metal cylindrical covering or housing 86 which is axially aligned and attached to a hand chain assembly 66, the function of which will be described below (FIG. 4). The releasing mechanism 82 comprises a sash chain 90 connected to a temperature sensitive means 88 such as a fusible link or the like (FIG. 3). The fusible link as shown comprises two pieces of metal held together by low melting-point solder. While the fusible link is intact, the sash chain 90 pulls a plunger 106 of a plunger mechanism 92 to compress a compression spring 104 inside a plunger mechanism 92 to prevent the plunger 106 from contacting a lever 98 (FIG. 3). When the ambient temperature surrounding the fire door reaches a predetermined value, the low melting-point solder melts and the fusible link separates, releasing the tension on the sash chain 90. With this tension removed, the compression spring 104 releases the plunger 106 to engage the lever 98 to disengage the brake 84 (FIG. 4). The preferred embodiment for the brake is an electromagnetic brake of the shoe-type. Additionally, the brake may be magnetically, hydraulically or pneumatically operated or a combination of the above. Preferably, it is a continuous duty, spring-set, solenoid-activated brake. The brake 84 includes brake shoes 108 which are movable between a braking position and a released position, a movable chain 96 (FIG. 3) and means for moving the brake shoes between a braking and a released position or brake moving means 100 here shown in the form a brake cam. When the fusible link is replaced and the sash chain 90 retracts the plunger 106, the expandable spring 94 attached to the lever 98 pulls the lever 98 back, which in turn moves the brake cam 100 to its original position to reengage the brake 84.

As shown, the movable chain 96 provides another way of releasing the brake 84. The movable chain 96 is connected to the lever 98 which releases the brake 84 by movement of the brake cam 100. In the preferred embodiment of the present invention, the brake 84 is axially aligned and located directly under the release mechanism 82. The lever 98 is attached to a tension spring 94, brake cam 100 and a solenoid 102. When the lever 98 is pulled down by the movable chain 96, brake moving means or cam 100 pivots to disengage the brake shoes 108 of the brake 84 to allow the input shaft 78 to rotate and permit the fire door 12 to rotate.

Yet another way to disengage or engage the brake 84 here optionally included is by the lever 98 being moved by the solenoid 102. When the fire door 12 is in a raised or open position, the brake 84 is engaged and the solenoid 102 is in an "open" position. An electric signal may be seat to the solenoid 102 by a control box (not shown) to actuate the solenoid 102 to a "closed" position. This disengages or releases brake 84 to permit the door to move to its closed position. When the fire door 12 thus closes, the signal to the solenoid 102 is reversed by the operation of a limit switch to be described hereinafter and the solenoid 102 releases the lever 98 which in turn reengages the brake 84.

By engaging or disengaging the brake 84, the input shaft 78 of the regulating mechanism 10 is either held stationary or allowed to rotate, respectively. When the brake 84 is engaged and the brake shoes 108 are in a brake position, the brake shoes 108 are engaging a cast iron barrel 110 which surrounds the brake shoes 108 and which is attached to and rotates the input shaft 78. The brake shoes 108 hold the cast iron barrel 110 stationary which in turn prevents the input shaft 78 from rotating. When the brake 84 is released, the brake shoes 108 are in a released position and are not engaging the iron barrel 110. This allows the iron barrel 110 to rotate which in turn allows the input shaft 78 to rotate. Attached to the cast iron barrel is a governor 112 which is a mechanical device that limits the rotational speed of shaft 78 and barrel 110 to thereby control the speed of descent of the door during automatic closure. In its preferred embodiment, the present invention comprises a centrifugal governor 112 preferably including two brake shoes 114 which are connected to each other at a pivot point 116 and are connected to shaft 78 and drum 110 as by a pin 111 to rotate therewith. Two tension springs 118 hold the brake shoes 114 in a closed position until the input shaft 78 is rotated at or above a preset speed at which point the brake shoes 114 begin to separate due to centrifugal force and thus apply a braking friction against the inside of a housing 120 to slow the speed of the input shaft 78. Thus, for example, the governor may be set to operate when the input shaft 78 rotates in excess of 1700 revolutions/rain (RPM) to prevent the input shaft 78 from exceeding that rotational speed. Additionally, the governor may operated pneumatically or hydraulically.

The input shaft 78 is then connected to a splined shaft 122 which drives a speed reduction gearing 124. The speed reduction gearing 124 may be of any suitable type but, as shown and preferred, comprises a planetary gearing assembly 126 which is housed in a gear housing 128 having its internal surface toothed to mesh with the planetary gears 132 and 138. The planetary gearing assembly 126 creates a large gear ratio of the order of 77:1 between the input shaft 78 and the output shaft 56 thereby decreasing the speed of the output shaft 56 to approximately 22 RPM, assuming the speed of input shaft 78 is 1700 RPM. Of course, other selected maximum speeds for the input shaft 78 will result in either a lower speed for the output shaft, or the use of a different gear ratio in the planetary gearing or some combination thereof as design criteria mandates. Additionally, the planetary gearing assembly 126 can be driven forward or backward unlike conventional worm gear or helical gear units which can not be driven backwards in this design configuration. The preferred embodiment of the present invention includes at least two sets of axially aligned planetary gearing, with the sun gear being a splined shaft 122 with at least 3 planet gears 132 surrounding it. The splined shaft 122 is connected to and rotates a drive plate 134 which in turn engages another splined shaft 136 which in turn rotates another set of planet gears 138 which in turn drives a drive plate 140. The low speed output shaft 56 is connected to the drive plate 140.

A limit switch sprocket 144 is connected to the low speed output shaft 56 which extends through a base 146 to engage the drive sprocket 62 of the chain drive 54. The regulating mechanism 10 is then mounted to the fire door 12 by the base 146 which preferably has three bolts for attachment to the fire door 12 to allow the base to move easily. The limit switch assembly 152 controls the extent of upward and downward movement of the fire door 12 and is driven by the limit switch rolling chain 148. The output shaft 56 rotates the limit switch sprocket 144 which in turn drives a limit switch sprocket rolling chain 148 to rotate a second limit switch sprocket 154 to engage the limit switch assembly 152 so that the upward and downward movement of the curtain 16 is controlled.

This configuration of the chain drive 54 and the speed reduction gearing regulates the speed of the door 12 closing and opening. The chain drive 54 which is placed between the regulating mechanism 10 and the rotatable member 36 of the door 12 has a speed reduction ratio of for example 5 to 1 and the planetary gearing assembly 126 has for example a speed reduction ratio of 77 to 1. Therefore the total speed reduction ratio between input shaft 78 and the rotatable member 36 to control the raising and lowering of the door 12 results in a 385 to 1 mechanical advantage thereby resulting in a reduced power requirement to raise and lower the door 12. However, with the governor on the high speed end of the power train, its regulation is sensitive and precise.

The regulating mechanism 10 may also be configured with the motor 64 being placed between the speed reduction gearing and the governor to control the raising and lowering of the curtain. This will not adversely affect the operation of the door as the governor will continue to act on the high speed portion of the power train. Additionally, the brake may be placed either before or after the speed reduction gearing of the regulating mechanism without adversely affecting the operation of the door as the brake will continue to prevent the output shaft of the regulating mechanism from rotating when the brake is engaged and allow the output shaft to rotate when it is disengaged.

Operation

If a fire occurs with the fire door in its raised position, the fusible link 88 melts, releasing the sash chain 90 which releases the plunger 106 by decompressing the compression spring 104. The plunger 106 pushes the lever 98 to engage the brake moving means or cam 100 to release the brake 84. Once the brake 84 has been released, the cast iron barrel 110 is released and the input shaft 78 is free to rotate as is the entire power train. This permits the door to start moving downwardly under the urging of gravity. As the door moves down, it rotates the elongated member 36 which through the chain drive 54 rotates shaft 56, which through planetary gearing 132 and 138 rotates shaft 78 and drum 110 at a high speed. In the preferred embodiment of the present invention, the governor 112 regulates the speed of the input shaft 78 once the input shaft 78 begins to rotate at a speed of 1700 RPM and maintains the input shaft 78 speed at slightly over 1700 RPM allowing the fire door 12 to close at a very gradual speed to prevent injury to escaping personnel and damage to the door. Additionally, during the closing of the door, the regulating mechanism 10 does not disengage the motor 64 from the door 12. The motor 64 remains connected and thus operatable to open or close the door if there is electrical power available.

Once the door is in its lowermost position, the raising of the door is easily accomplished by operating a control panel to energize the motor to raise the door without the need for any adjustments or manipulations of the equipment or regulating mechanism other than resetting the door by pulling the sash chain 90 which in turn pulls the plunger 106 of the plunger mechanism 92 away from the lever 98 and replacing the fusible link 88 to hold the sash chain 90 in place. As will be described in greater detail hereinafter, the ordinary control mechanism for the motor (not shown), would preferably include an "Up" button, a "Down" button and a "Stop" button, which buttons, through conventional control means will operate the polarity of energization of the motor so as to cause it to rotate in an "Up" direction or a "Down" direction. In a lowered position, when the "Up" button is actuated, the motor 64 will be actuated to move the door upwardly. When the door 12 moves to the uppermost position, the limit switch assembly 152 will operate to de-energize the motor and to reset the solenoid control brake 84 and thereby relock the door in the up or raised position.

The present invention may also be used for a door that is capable of high cycle operation, i.e., 50,000 to 100,000 cycles or runs. A control box (not shown) may be connected to the motor 64 to allow the regulating mechanism 10 to raise and lower the door. A control station for the control box, including buttons, switches or the like, may comprise an "Up" button, a "Down" button and a "Stop" button. When the "Up" button on the control panel is pressed or engaged, the control box sends a signal to the solenoid 102 which releases the brake 84. The brake 84 disengages the input shaft 78 to allow the motor 64 to drive the input shaft 78 which in turn drives the regulating mechanism 10 to drive the output shaft 56 to wind the curtain 16 around the barrel 36 of the door. When the "Down" button is pressed the motor 64 drives the shafts and the regulating mechanism 10 in the opposite direction to unwind the curtain 16 from the barrel 36 until the curtain 16 closes. When the curtain 16 reaches a predetermined limit due to the configuration of the limit switch assembly 152, the power to the motor 64 is cut off and a signal is sent to the solenoid 102, which re-engages the brake 84. The door stops at an open position or closed position because of the limit switch assembly 152. The stop button or switch can stop-the motor 64 from either raising or lowering the curtain 16.

In emergency situations, the hand chain assembly 66 can operate the door 12 during a power failure or removal of the motor 64 for inspection or servicing. The hand chain assembly 66 is activated when a lever chain 74 is pulled to engage a lever 72. The lever 72 activates the hand chain assembly 66 so that a hand chain 70 can then be pulled to rotate the shaft 68 of the coupling 76 to rotate the input shaft 78 of the regulating mechanism 10.

Additionally, a safety edge device may be incorporated with the bottom bar 34 so that in the event a person was beneath the door as it was closing, the safety edge device would be triggered and would immediately reverse the door to the open position momentarily and then again permit the door to begin its descent to secure the opening from a fire. The safety edge device would continue to work so long as electrical power is provided to the motor. It is for this reason among others that auxiliary power may be desirable.

It should be understood that the preferred embodiments and examples described are for illustrative purposes only and are not to be construed as limiting the scope of the present invention which is properly delineated only in the appended claims.

What is claim is:

1. A brake comprising:

a brake shoe moveable between a braking position for preventing rotation of a shaft and a released position for allowing rotation of said shaft;

temperature sensitive means for detecting a temperature;

an actuator; and means for releasing said brake shoe comprising an elongate member having a central portion secured to said brake shoe, a first end portion coupled to said temperature sensitive means, a second end portion coupled to said actuator, said elongate member being pivotable about said central portion, said central portion being located substantially midway between said first and second end portions, said means for releasing said brake shoe causing said brake shoe to move from the braking position to the released position in response to one of (1) said temperature sensitive means upon said temperature reaching a predetermined temperature and (2) said actuator.

2. The brake according to claim 1, wherein said second end portion is directly connected to said actuator.

3. The brake according to claim 1, further comprising a movable chain, wherein said means for releasing is further responsive to said movable chain when said movable chain is moved.

4. The brake according to claim 1, wherein said temperature sensitive means comprises a fusible link.

5. The brake according to claim 1, wherein said temperature sensitive means further comprises a mechanical linkage for communicating with said means for releasing.

6. The brake according to claim 1, wherein said actuator is a solenoid.

7. The brake according to claim 1, wherein said actuator is manually operated.

* * * * *